(12) United States Patent
Becquerelle et al.

(10) Patent No.: US 7,033,529 B2
(45) Date of Patent: Apr. 25, 2006

(54) PLAIN BEARING PROVIDED WITH A FRICTION COATING AND METHOD FOR MAKING SAME

(75) Inventors: Samuel Raymond Germain Becquerelle, Le Vesinet (FR); Alexander Butarov, Samara (RU); Dimitry Fedorchenko, Samara (RU); Michael Fomin, Samara (RU); Benjamin Arthur Marie Peiron, Paris (FR); Daniel Victor Marcel Ville, Meudon-la-Foret (FR)

(73) Assignees: Hispano-Suiza, Colombes (FR); JSC N.D. Kusnetsov STC, Samara (RU)

( * ) Notice: Subject to any disclaimer, the term of this patent is extended or adjusted under 35 U.S.C. 154(b) by 0 days.

(21) Appl. No.: 10/478,691

(22) PCT Filed: Jun. 6, 2002

(86) PCT No.: PCT/FR02/01927

§ 371 (c)(1),
(2), (4) Date: Nov. 3, 2004

(87) PCT Pub. No.: WO02/099297

PCT Pub. Date: Dec. 12, 2002

(65) Prior Publication Data

US 2005/0047949 A1 Mar. 3, 2005

(30) Foreign Application Priority Data

Jun. 7, 2001 (FR) .................................. 01 07414

(51) Int. Cl.
*B29C 71/00* (2006.01)

(52) U.S. Cl. .................. 264/127; 264/255; 264/265; 264/346; 264/320

(58) Field of Classification Search ............... 264/320, 264/346, 255, 127, 265, 101
See application file for complete search history.

(56) References Cited

U.S. PATENT DOCUMENTS

| | | | | |
|---|---|---|---|---|
| 4,655,944 A * | 4/1987 | Mori | ............................ | 428/545 |
| 4,657,683 A * | 4/1987 | Davies | ........................ | 428/551 |
| 5,091,098 A * | 2/1992 | Tanaka et al. | ............... | 508/104 |
| 5,447,774 A * | 9/1995 | Tanaka et al. | ............... | 428/141 |
| 5,780,396 A * | 7/1998 | Tanaka et al. | ............... | 508/104 |
| 6,042,778 A * | 3/2000 | Kraft et al. | ..................... | 419/27 |
| 6,178,639 B1 | 1/2001 | Lytwynec et al. | | |
| 6,485,608 B1 * | 11/2002 | McDonald et al. | ........... | 162/103 |

FOREIGN PATENT DOCUMENTS

| | | |
|---|---|---|
| GB | 2 185 697 | 7/1987 |
| GB | 2 321 676 | 8/1998 |

* cited by examiner

*Primary Examiner*—Edmund H. Lee
(74) *Attorney, Agent, or Firm*—Oblon, Spivak, McClelland, Maier & Neustadt, P.C.

(57) ABSTRACT

A high-performance plain bearing provided with a friction coating including a bronze layer whereof the pores are filled with a PTFE-type fluoroplastic paste filled with molybdenum bisulphide. The production method includes sintering a layer of bronze powder on the metal support of the bearing, a vacuum ionic cleaning, applying a filled fluoroplastic film, passing the component through a die and after sintering the paste, a final pass in the die for final dimensioning. During sintering and passing through the die an anti-adhesive and wear-resistant coating, based on titanium nitride or the like, is applied on the equipment.

20 Claims, 1 Drawing Sheet

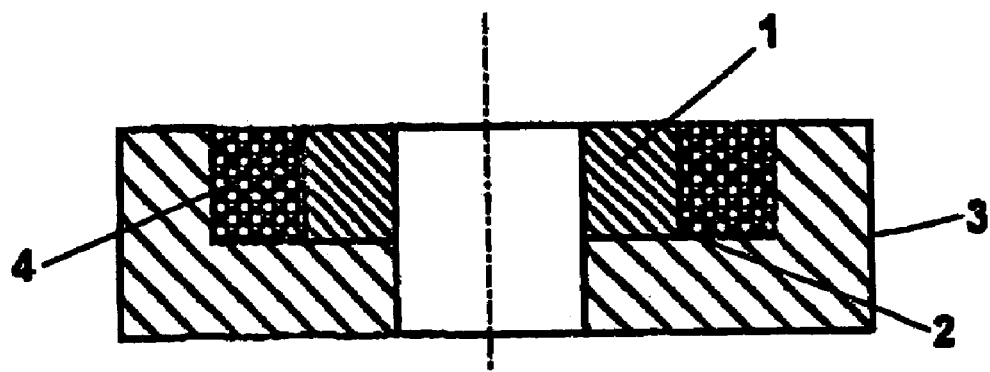
Fig. : 1
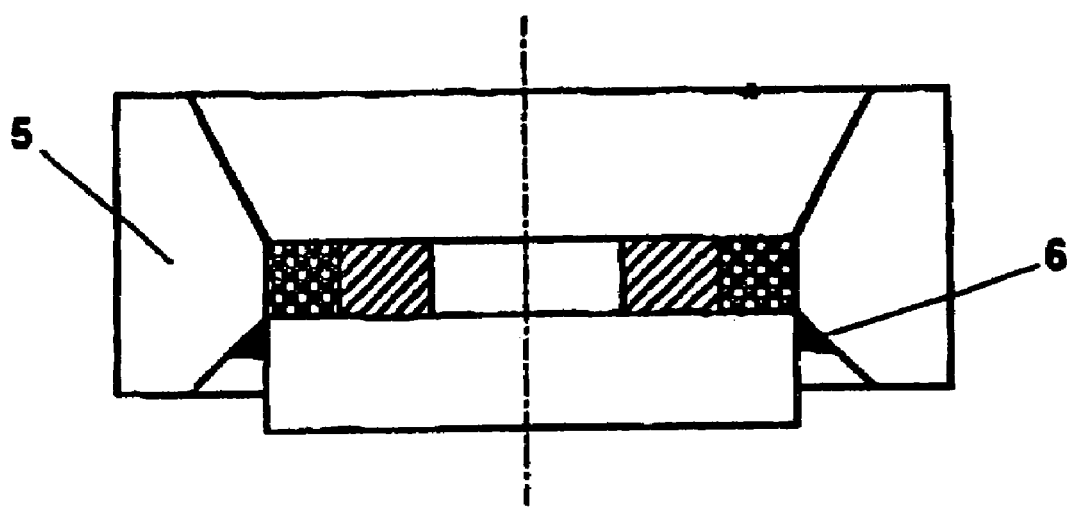
Fig. : 2

PLAIN BEARING PROVIDED WITH A FRICTION COATING AND METHOD FOR MAKING SAME

BACKGROUND OF THE INVENTION (1) Field of the Invention

The present invention relates to a plain bearing equipped with a friction coating and to the method for producing said coating.

(2) Description of Related Art

High-performance plain bearings are needed in various fields particularly in the reduction gearboxes of turbojet engines with high bypass ratios.

The search for high performance has led to the proposal of various improvements to plain bearings. Hence, U.S. Pat. No. 3,644,105 describes a bearing comprising a composite coating of copper and molybdenum disulfide obtained by electrolytic codepositon. A surface layer consisting of a lead-based alloy containing tin and copper completes the coating.

The earlier known solutions are not, however, entirely satisfactory and, particularly in the applications mentioned herein above, there is still a need to develop plain bearings that provide good operating conditions and good service life after the corresponding severe conditions of use. These conditions in particular include resistance to very high pressure, operation at high linear speed, resistance to high temperature and the plain bearings also have to be capable of operating with lubrication by a low-viscosity oil and, for short periods, without oil.

BRIEF SUMMARY OF THE INVENTION

These results are obtained satisfactorily according to the invention by a high-performance plain bearing equipped with friction coating characterized in that the coating comprises a layer of bronze obtained by sintering and the pores of which are filled with a fluoroplastic paste filled with molybdenum disulfide.

This friction coating is obtained in a way that is remarkable according to the invention using a method characterized in that it involves the following steps:

(a) sintering a layer of bronze powder onto a metallic support under a reducing atmosphere using tooling comprising a non-stick and wear-resistant coating;

(b) ionic cleaning under vacuum to activate the surface of the sintered bronze layer without increasing the roughness of the layer;

(c) applying a layer of fluoroplastic paste of the PTFE type filled with molybdenum disulfide to the sintered bronze surface and installing into a die the support coated with the sintered bronze layer;

(d) passing the component consisting of the coated metallic support into the die with the addition of a non-stick and wear-resistant coating so as to compress the paste applied in step (c) into the pores of the sintered bronze layer;

(e) drying the paste;

(f) passing the component a second time through the die with the addition of a non-stick and wear-resistant coating;

(g) sintering the paste under determined duration and temperature conditions followed by immersion in water;

(h) passing the bearing component a final time through a die equipped with a non-stick coating so as to achieve its end dimensions.

Particular conditions of production and advantageous parameters are also determined.

BRIEF DESCRIPTION OF THE DRAWINGS

Other characteristics and advantages of the invention will be better understood from reading the description which will follow of one exemplary embodiment of the invention, with reference to the attached drawings in which:

FIG. 1 depicts, in view in longitudinal section, the metallic support of the plain bearing according to the invention during one step in its production;

FIG. 2 depicts, in view in longitudinal section, the metallic support of the plain bearing according to the invention during another step in its manufacture.

DETAILED DESCRIPTION OF THE INVENTION

A plain bearing especially intended for aeronautical applications such as the reduction gearboxes of turbojet engines with high bypass ratios comprises, in a conventional way, a metallic support schematically depicted as 1 in FIG. 1. The method of producing a friction coating on a plain bearing according to the invention involves a prior step:

(a1) electrolytic deposition of a layer 2 of copper onto the metallic support 1, followed by tinning.

As depicted in FIG. 1, the metallic support 1 thus coated is then placed in a container 3, forming around the support 1 of the receptacle in which bronze powder is placed for carrying out step (a) of the method according to the invention:

(a) sintering a layer 4 of bronze powder onto the metallic support 1, under conditions known per se of temperature and reducing atmosphere and using tooling comprising a non-stick and wear-resistant coating.

The next step (b) of said method consists in ionic cleaning under vacuum so as to obtain activation of the sintered bronze layer.

In step (c), a layer about 1 mm thick of fluoroplastic paste of the PTFE (polytetrafluroethylene) type filled with molybdenum disulfide is applied to the entire sintered bronze surface and the support 1 coated with the sintered bronze layer 4 is then placed in a die 5, as depicted schematically in FIG. 2; next, in step (d), the component 1 consisting of the coated metallic support is passed through the die 5 with the addition of a non-stick and wear-resistant coating so as to compress the paste applied in step (c) into the pores of the sintered bronze layer. The coating used may, in particular, be based on titanium nitride or may be a coating with equivalent properties such as one based on zirconium nitride, chromium nitride or possibly aluminum nitride. This coating avoids the sintering of the bronze onto the tooling and avoids the disadvantages of other products known earlier such as graphite which contaminates the bronze and damages the adhesion of the bronze to the metallic material of the support. The same coating is also used in step (a) during sintering for the same reasons.

In the next step (e), the paste is dried, something which may, for example, be performed at 90° C. for 2 hours. In step (f) the bearing component 1 is shaped by passing it a second time into the die with the addition of the non-stick and anti-wear coating as defined above. Step (g) of sintering the paste is then carried out under determined conditions such as at 375° C. for 40 minutes and the component is then immersed in water.

Finally, in the final step (h) the bearing component 1 is passed through the die, still equipped with the non-stick coating, to size it to its end dimensions.

No further machining of the plain bearing thus obtained is needed. The qualities of adhesion to the support and the anti-friction qualities of the coating according to the invention thus obtained allow the plain bearing to satisfy the high performance demanded for its operation. In particular, the plain bearing obtained resists very high pressures that may exceed 50 mPa in the oil film. It can operate at high linear speeds and at temperatures up to 120° C. It tolerates low-viscosity oil down to $5\times10^{-6}$ m²/s at 100° C. and the bearing is capable of operating without oil for short periods, at reduced load.

The invention claimed is:

1. A method for making a friction coating on a high-performance plain bearing, comprising:
   (a) sintering a layer of bronze powder onto a metallic support under a reducing atmosphere using tooling comprising a non-stick and wear-resistant coating;
   (b) ionically cleaning the sintered bronze layer under vacuum to activate a surface thereof without increasing a roughness of the sintered bronze layer;
   (c) applying a layer of PTFE fluoroplastic paste filled with molybdenum disulfide to the activated surface and installing into a die the support coated with the sintered bronze layer;
   (d) passing the metallic support coated with the sintered bronze layer into the die having a non-stick and wear-resistant coating to compress the PTFE fluoroplastic paste into pores of the sintered bronze layer;
   (e) drying the compressed PTFE fluoroplastic paste;
   (f) passing the metallic support coated with the sintered bronze layer having the dried PTFE fluoroplastic paste a second time into the die;
   (g) sintering the dried PTFE fluoroplastic paste under predetermined duration and temperature conditions followed by immersion in water; and
   (h) passing the metallic support coated with the sintered bronze layer having the dried PTFE fluoroplastic paste a final time into the die to achieve end dimensions of the metallic support coated with the sintered bronze layer.

2. The method for producing a friction coating on a plain bearing as claimed in claim 1, wherein the non-stick and wear-resistant coating used in the sintering (a), the passing (d), the passing (f) and the passing (h) is based on titanium nitride or on a nitride with equivalent properties, the nitride being selected from a group consisting of zirconium nitride, chromium nitride, and aluminum nitride.

3. The method for producing a friction coating on a plain bearing as claimed in claim 1, wherein the drying (e) is performed at 90° C. for two hours and the sintering (g) is performed at 375° C. for 40 minutes.

4. The method for producing a friction coating on a plain bearing as claimed in claim 2, wherein the drying (e) is performed at 90° C. for two hours and the sintering (g) is performed at 375° C. for 40 minutes.

5. The method for producing a friction coating on a plain bearing as claimed in claim 1, further comprising before the sintering (a):
   (a1) electrolytically depositing copper onto the metallic support under conditions known per se, followed by tinning.

6. The method for producing a friction coating on a plain bearing as claimed in claim 2, further comprising before the sintering (a):
   (a1) electrolytically depositing copper onto the metallic support under conditions known per se, followed by tinning.

7. The method for producing a friction coating on a plain bearing as claimed in claim 3, further comprising before the sintering (a):
   (a1) electrolytically depositing copper onto the metallic support under conditions known per se, followed by tinning.

8. The method for producing a friction coating on a plain bearing as claimed in claim 4, further comprising before the sintering (a):
   (a1) electrolytically depositing copper onto the metallic support under conditions known per se, followed by tinning.

9. A method for making a friction coating on a bearing, comprising:
   sintering a layer of bronze powder onto a metallic support under a reducing atmosphere;
   ionically cleaning under a vacuum a surface of the sintered bronze layer forming an activated surface;
   applying a layer of a fluoroplastic paste to the activated surface and placing the support coated with the sintered bronze layer in a die;
   compressing within the die the fluoroplastic paste into pores of the sintered bronze layer;
   drying the compressed fluoroplastic paste in the sintered bronze layer;
   sintering the dried fluoroplastic paste followed by immersing the metallic support with the sintered bronze layer and the sintered fluoroplastic paste in water; and
   placing the metallic support with the sintered bronze layer and the sintered fluoroplastic paste in the die.

10. The method according to claim 9, wherein the sintering the layer of bronze powder includes sintering the layer of bronze powder with tooling having a non-stick and wear-resistant coating.

11. The method according to claim 9, wherein the ionically cleaning includes ionically cleaning the sintered bronze layer without increasing a roughness thereof.

12. The method according to claim 9, wherein the fluoroplastic paste is a PTFE fluoroplastic paste with molybdenum disulfide.

13. The method according to claim 9, wherein the die has a non-stick and wear-resistant coating.

14. The method according to claim 13, wherein the non-stick and wear-resistant coating is based on titanium nitride or on a nitride selected from the group consisting of zirconium nitride, chromium nitride, and aluminum nitride.

15. The method according to claim 9, further comprising:
   before sintering the layer of bronze powder, electrolytically depositing copper onto the metallic support followed by tinning.

16. The method according to claim 9, wherein the drying is performed at 90° C. for two hours and the sintering of the fluoroplastic paste is performed at 375° C. for 40 minutes.

17. The method according to claim 9, wherein a thickness of the fluoroplastic layer is about 1 mm.

18. The method according to claim 9, wherein the bearing is configured to resist oil film pressures in excess of 50 MPa.

19. The method according to claim 9, wherein the bearing is configured to operate at a temperature of up to 120° C.

20. The method according to claim 9, wherein the bearing is configured to operate with an oil having a viscosity as low as $5\times10^{-6}$ m²/s at 100° C.

* * * * *